United States Patent [19]
Blank

[11] 3,854,602
[45] Dec. 17, 1974

[54] MAGNETIC HOPPER SYSTEM

[75] Inventor: Fritz Blank, Miramar, Fla.

[73] Assignee: Coulter Electronics, Inc., Hialeah, Fla.

[22] Filed: Aug. 27, 1973

[21] Appl. No.: 391,582

[52] U.S. Cl. ............... 214/6 BA, 198/41, 198/225, 214/8.5 A, 214/8.5 G, 221/212
[51] Int. Cl. ...................... B65g 57/30, B65g 59/06
[58] Field of Search .......... 214/6 BA, 8.5 R, 8.5 A, 214/8.5 G, 8.5 D; 221/212, 262, 268; 198/41, 219, 225

[56] References Cited
UNITED STATES PATENTS

| | | | |
|---|---|---|---|
| 787,623 | 4/1905 | Hood | 221/212 X |
| 1,462,510 | 7/1923 | Lister | 198/225 |
| 2,544,735 | 3/1951 | Strickler | 214/6 BA |
| 2,940,327 | 6/1960 | Gartner | 214/6 BA X |
| 3,513,990 | 5/1970 | Wolle | 214/6 BA |
| 3,771,670 | 11/1973 | Napoleone et al. | 214/6 BA |
| 3,791,509 | 2/1974 | Jones | 198/41 |

Primary Examiner—Robert G. Sheridan
Assistant Examiner—Leslie J. Paperner
Attorney, Agent, or Firm—Silverman & Cass, Ltd.

[57] ABSTRACT

The system includes first and second hoppers or magazines located adjacent respective ends of a conveyor. The first magazine includes a three-sided enclosure with a vertically movable magnetic plate situated therein for holding thereagainst elongate objects having magnetizable material therein. A plurality of pawls which are deflectable inwardly of the plate are situated adjacent the movable plate. They are deflected inwardly when the plate is moved downwardly and engage and hold objects in a lowered position when the plate moves upwardly, the plate slidingly engaging the objects during the upward movement. The lowermost position to which an object is moved is adjacent the conveyor which engages the object and moves it laterally from the first magazine. The second magazine includes a stationary magnetic plate for holding a plurality of the elongate objects thereagainst. A vertically reciprocal pushing mechanism is located beneath the plate and is operable to sequentially push objects from the conveyor onto the plate. The pushing mechanism includes an air cylinder, two rods connected to the piston rod of the cylinder and an elongate head which is movable transversely of the long axis thereof and which is detachably connected to the rods.

8 Claims, 7 Drawing Figures

MAGNETIC HOPPER SYSTEM

CROSS-REFERENCE TO RELATED APPLICATION

The subject matter of this application is related to subject matter disclosed in U.S. application Ser. No. 195,363, filed on Nov. 3, 1971 now U.S. Pat. No. 3,791,509. This related application is assigned to the assignee of the present application.

BACKGROUND AND SUMMARY OF THE INVENTION

The invention relates to a system for storing elongate objects, for sequentially moving the objects onto a conveyor at a first location, for sequentially moving the objects from the conveyor at a second location downstream from the first location and for storing the objects at the second location.

More specifically the invention relates to a system of the type described above for use in an automatic chemical analysis apparatus where specimen samples to be analyzed are held in cups which are stored in elongate block-shaped sample cup holders. These sample cup holders are moved by positive engagement of same with a conveyor mechanism in a generally horizontal plane past a series of sampling heads which withdraw aliquots of the samples into reaction tubes. The present system provides convenient and safe mechanisms for holding the sample cup holders in close proximity to the conveyor mechanism prior to their engagement with a conveyor chain of the conveyor mechanism and convenient and safe mechanisms for receiving and temporarily storing the sample cup holders subsequent to their generally horizontal conveyance past the sampling heads.

The present magnetic hopper system is an improvement on the magnetic hopper system disclosed in U.S. application Ser. No. 195,363, filed on Nov. 3, 1971. The improved features of the present system will be described in detail hereinafter.

Prior art article handling systems related somewhat to the system to be described hereinafter and to the system described in the related application Ser. No. 195,363 are disclosed in the following United States patents:

| U.S. Patent No. | Class |
| --- | --- |
| 2,544,735 | 214-6 |
| 2,940,327 | 214-6 |
| 3,513,990 | 214-6 |
| 3,575,692 | 23-253 |

According to the invention there is provided in a system for storing elongate objects each having magnetizable material therein and for sequentially moving the objects transversely of the long axis of each object onto a conveyor, a magazine including a generally upright member having means for magnetically holding a plurality of objects thereagainst, deflectable pawls situated adjacent said upright member and deflectable inwardly of the plate, and means for moving said upright member downwardly to move the objects held thereto from an upper position downwardly over said pawls to lower position and for moving said upright member upwardly as said pawls engage the objects and hold the same in the lowered position, the lowermost position being adjacent the conveyor.

Also according to the invention there is provided in a system for storing elongate objects each having magnetizable material therein and for sequentially moving the objects transversely of the long axis of each object from a conveyor into a magazine including a generally upright plate having means for magnetically holding a plurality of objects thereagainst, pushing means for pushing each object from the conveyor onto the generally upright plate, said pushing means including an elongate head moveable transversely of the long axis thereof, power means for moving said head and means for detachably connecting said head to said power means.

DESCRIPTION OF THE PREFERRED EMBODIMENT OF THE INVENTION

Figure 1:
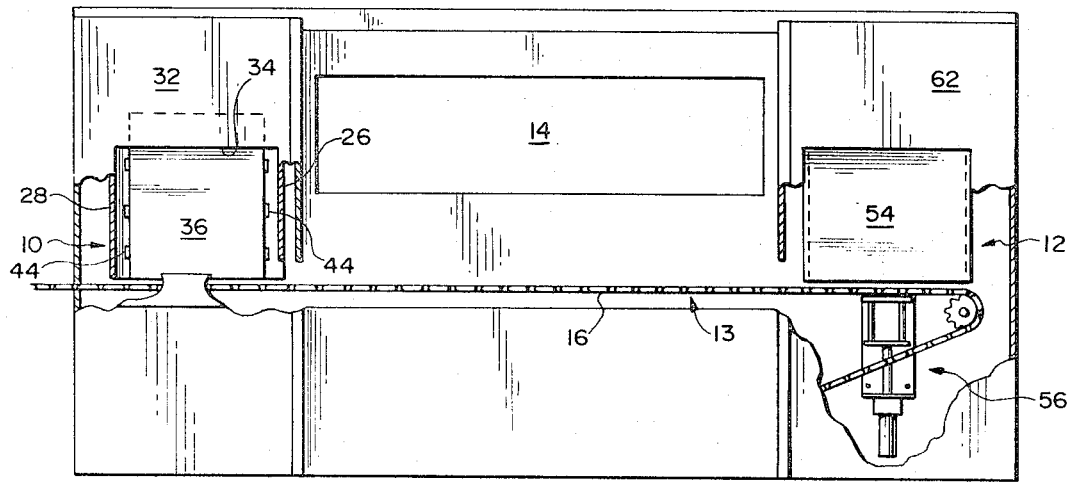
FIG. 1 is a elevational view with portions broken away of a portion of an automatic chemical analysis apparatus incorporating the magnetic hopper system of the present invention.
Figure 2:
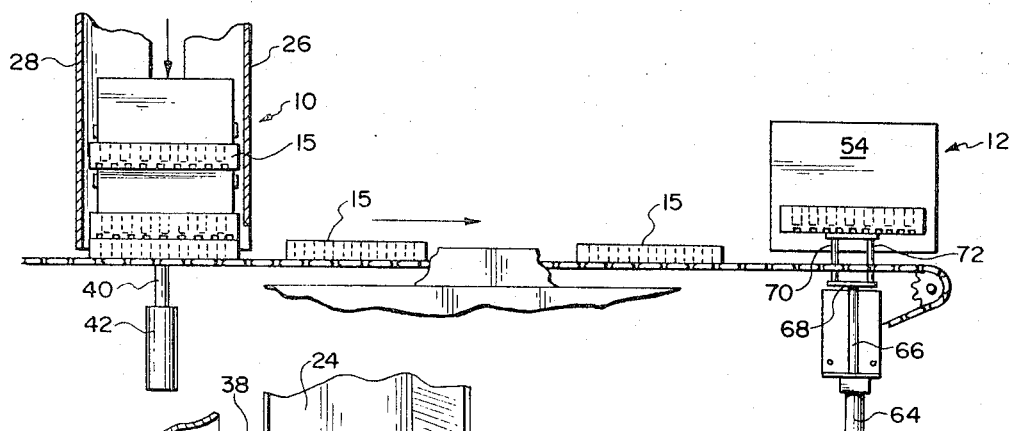
FIG. 2 is a fragmentary elevational view showing sample cup holders in the hoppers of the system and on the conveyor extending therebetween.

The present magnetic hopper system is shown in FIGS. 1 and 2 and includes first and second spaced apart hoppers or magazines 10 and 12 mounted adjacent a conveyor mechanism 13. In the illustrated embodiment the magazines 10 and 12 are located, respectively, at the upstream and downstream ends of a sampling station 14 in an automatic chemical analysis apparatus particularly adapted for making automatic analysis of blood samples. The blood samples are first obtained from a patient and then placed in a sample cup which in turn is placed in a block-shaped sample cup holder 15 (FIGS. 2, 3 and 6) as best shown in FIG. 2 a plurality of holders 15 each having magnetizable material therein are stored in the first magazine 10 and are sequentially moved into engagement with a chain 16 of the conveyor mechanism 13 at predetermined intervals. The holders 15 are then indexed by the conveyor mechanism 13 along and on a supporting surface 17 (FIG. 3) past sampling heads (not shown) at the sampling station 14 toward the second magazine 12 at the downstream end of the sampling station 14. After a holder 15 has been moved to a position adjacent the second magazine 12 it is moved off the conveyor mechanism 13 and upwardly into the second magazine 12.

Figure 3:
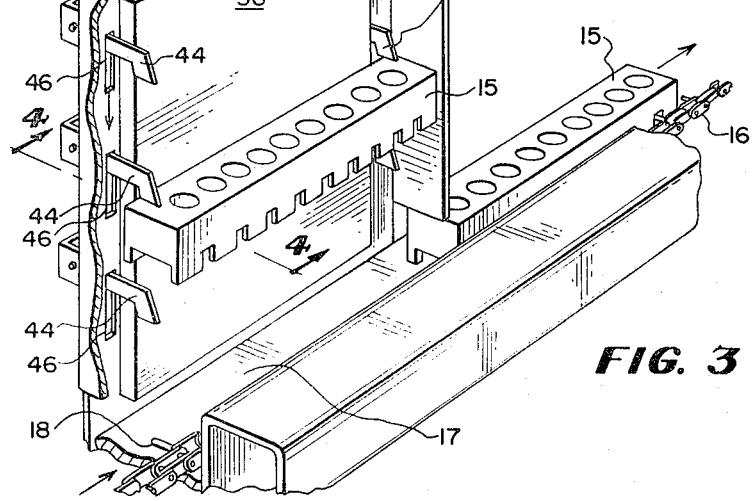
FIG. 3 is a fragmentary perspective view of the first hopper or magazine of the system.

As best shown in FIG. 3 some of the pintles of the chain 16 extend laterally from the chain 16 to form pins 18 which engage in slots 20 in the holders 15. It will be understood that movement of the chain 16 is synchronized with the movement of holders 15 onto the supporting surface 17 so that the holders 15 are only moved onto the surface 17 when the pins 18 are aligned with the slots. Then when the chain 16 is indexed positive engagement of the pins 18 in the slots 20 ensures that the holder 15 is indexed the proper distance toward the sampling station 14.

As best shown in FIG. 3 the magazine 10 includes a three-sided enclosure 22 defined by a center wall 24 and opposing side walls 26 and 28. The enclosure 22 is fixed to the supporting framework for the system such as by securing the free edges of the side walls 26 and 28 to a front panel 32 of a cabinet enclosing part of the magnetic hopper system. As shown in FIG. 1, the panel 32 has an opening 34 providing access to the magazine 10. Situated within the enclosure 22 adjacent the inner side of the center wall 24 is a generally upright magnetic plate 36. Attached to the upper backside of the plate 36 is a bracket 38 which in turn is connected to a rod 40 which extends from a piston and cylinder mechanism 42 (FIG. 2). The piston and cylinder mechanism 42 is operable to move the plate 36 upwardly and downwardly at predetermined intervals. As shown the wall 24 has a vertical slot 43 therein within which the bracket 38 is received during movement of the plate 36.

Figure 4:
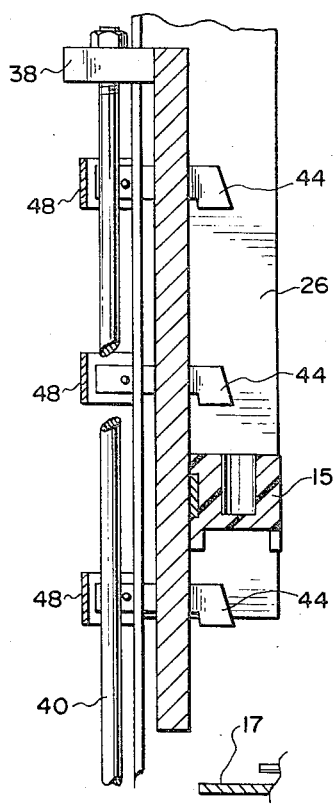
FIG. 4 is a vertical sectional view taken along line 4—4 of FIG. 3.

Situated adjacent the side edges of the plate 36 are a plurality of pawls 44. The pawls 44 are aligned in pairs and in the illustrated embodiment, three pairs of pawls 44 are provided. Each pawl 44 extends through a slot 46 in the center wall 24. As best shown in FIGS. 3 and 4, a plurality of mounting brackets 48 are fixed to the outer or backside of the wall 24 and each one of the pawls 44 is pivotally mounted to one of the brackets 48.

As best shown in FIG. 2, the slots 46 are elongate and each pawl 44 extends through the slot 46 adjacent the upper end thereof so that the pawls 44 are deflectable inwardly and downwardly but not upwardly.

As stated above, the plate 36 is made of magnetic material or is coated with a magnetic substance. Preferably, the plate 36 is coated with a layer of rubber in which there are embedded magnetized ferrite particles that have been magnetized in such a way that the magnetic poles of the particles are randomly distributed in the layer of rubber. Each of the sample cup holders 15 has magnetizable material therein. Preferably and as best shown in FIG. 4, each sample cup holder 15 is made of a non-metallic material and has a steel strip 52 embedded in the backside thereof, the steel strip 52 constituting the magnetizable material.

Figure 5:
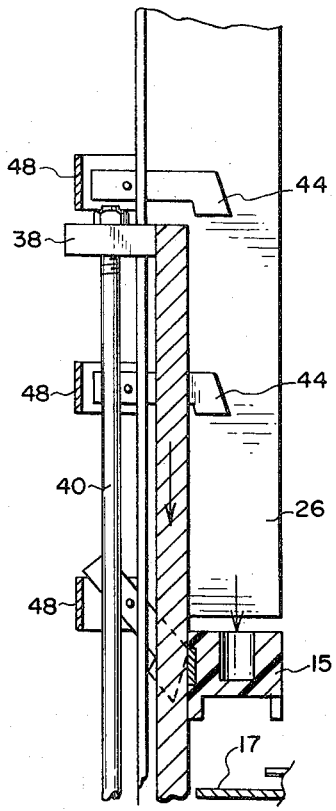
FIG. 5 is a vertical sectional view similar to the view shown in FIG. 4 showing the moveable plate of the first magazine in a lowered position.

It will be understood that in the operation of the magnetic hopper system a plurality such as three or four sample cup holders 15 are inserted into the magazine 10 through the opening 34 and magnetically held to the plate 36. It will be noted that the sample cup holders 15 are longer than the width of the plate 36 such that the ends of the holder 15 are in position to engage the pawls 44. At a predetermined time when it is desired to lower one of the holders 15 onto the surface 17 and into engagement with the chain 16, the plate 36 is moved downwardly with the ends of the holders 15 passing over the pawls 44 which are deflected downwardly and inwardly (FIG. 5). After the plate 36 has finished its downward stroke the sample cup holders are in a lowered position, the lowermost position being on the supporting surface 17 adjacent the conveyor chain 16. It will be noted that if there is any overshoot in the downward movement of the plate 36, the lowermost sample cup holder 15 that engages the supporting surface 17 will merely slide on the plate as the plate 26 goes further downwardly. Then while the plate 36 is in its lowermost position, the conveyor mechanism 13 is operated to index the lowermost sample cup holder out of the magazine 10 toward the sampling station 14. Subsequently, the plate 36 is raised and will carry therewith the other sample cup holders held thereagainst until these sample cup holders engage one of the pairs of pawls. At that time further upward movement of the sample cup holder is stopped and the plate 36 slides upwardly past the retained sample cup holders until it reaches its uppermost position. In this way, the sample cup holders 15 are sequentially moved downwardly to the conveyor mechanism 13.

During the operation of the automatic chemical analysis apparatus an operator from time to time will place sample cup holders into the magazine 10 at different points in time of the operation of the various mechanisms of the apparatus. Should the operator insert a plurality of sample cup holders into the magazine 10 when the cylinder 42 is operated to move the plate 36 downwardly, the operator's hand will not be forced downwardly so as to cause injury to his hand because of the sliding engagement between the plate 36 and the sample cup holders 15. As a result a safety feature is inherent in the mechanism just described for moving the sample cup holders downwardly into engagement with the conveyor chain 16.

Figure 6:
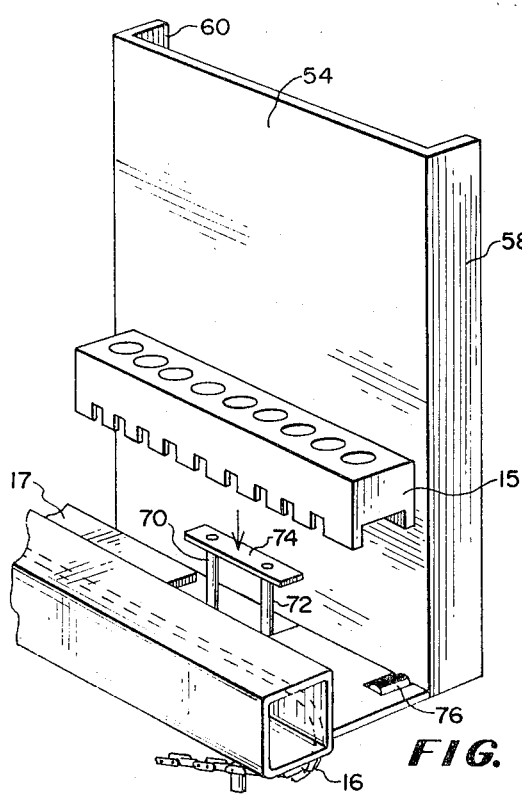
FIG. 6 is a perspective view of the second magazine of the system.

Referring to FIGS. 1, 2, 6 and 7, the second magazine 12 includes a generally upright plate 54 which has magnetic material therein and a pushing mechanism 56 (FIG. 1). The plate 54 is not enclosed and instead has mounting flanges 58 and 60 for securing the plate 54 to the outer surface of a panel 62 of the cabinet shown in FIG. 1. As shown in FIGS. 1, 2 and 6, the magazine 12 is constituted solely by the pushing mechanism 56 and the upright plate 54 which does not obstruct the path of movement of sample cup holders 15 as they travel on the conveyor chain 16. Specifically, the magazine 12 does not include side walls such as side walls 26 and 28. As a result if the pushing mechanism 56 should fail to operate, the sample cupholders 15 will be carried right off the edge of the supporting surface 17 and fall down into the bottom of the cabinet. This will prevent the jamming up of sample cup holders 15 at the end of the conveyor mechanism 13 adjacent the magazine 12.

Figure 7:
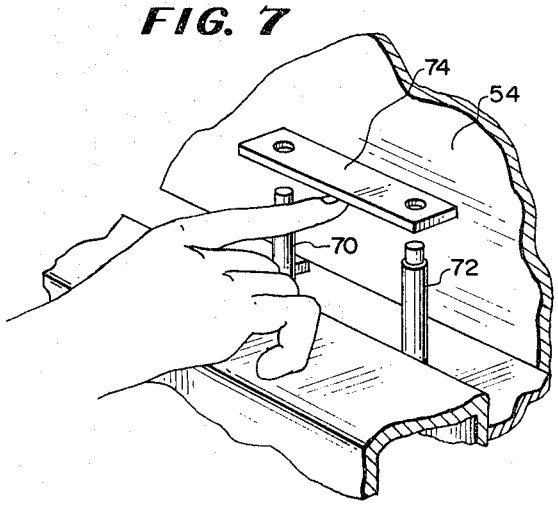
FIG. 7 is a fragmentary perspective view showing the head of the pushing mechanism associated with the second magazine detached from the two rods to which it is snap-fittingly connected.

The pushing mechanism 56 includes a piston and cylinder mechanism 64, from which a piston rod 66 extends and is connected to a supporting plate 68, supporting rods 70 and 72 mounted to the plate 68 and an elongate head 74 which is detactably connected to the outer ends of the rods 70 and 72. More specifically, the elongate head 74 is snap fittingly connected to the ends of the rods 70 and 72 so that it can be easily detached from the rods 70 and 72 as best shown in FIG. 7. It will be noted that the head 74 is mounted for movement transversely of the long axis thereof.

In the operation of the magnetic hopper system, a sample cup holder traveling on the conveyor chain 16 will engage a limit switch 76 (FIG. 6) as it reaches the end of the conveyor mechanism 13 adjacent the magazine 12. This will cause operation of the pushing mechanism 56 which will then push the sample cup holder upwardly as shown in FIGS. 2 and 6. When a subsequent sample cup holder 15 arrives at the end of the conveyor 13 adjacent the magazine 12, the mechanism 56 will again be actuated and push the subsequent cup holder 15 upwardly. This second sample cup holder 15 will engage the undersurface of the first sample cup holder and push the same upwardly on the plate 54. After a plurality of sample cup holders have been received in the magazine 12 in the manner just described, an operator will remove them from the plate 54. If by chance the operator should insert his finger underneath the head 74 when removing sample cup holders 15 from the magazine 12, his fingers will not be forced downwardly so as to cause injury to same inasmuch as the head 74 will snap loose from the rods 70 and 72 when the piston rod 66 moves downwardly. In this way a safety feature is incorporated into the pushing mechanism 56 of the second magazine 12.

It will be apparent from the foregoing description that the magnetic hopper system and the magazines therefor described above provide a number of advantages some of which have been described above an others of which are inherent in the system and magazines therefore. In particular, the system provides simple and convenient structure and mechanisms for temporarily storing sample cup holders, for moving the sample cup holders onto and off of a conveyor mechanism which carries them past a sampling station and for minimizing the possibility of injury to an operator when he is loading or unloading sample cup holders into or out of the magnetic hopper system.

What is desired to secure by Letters Patent of the United States is:

1. In a system for storing elongate objects each having magnetizable material therein and for sequentially moving the objects transversely of the long axis of each object onto a conveyor, a magazine including a generally upright member having means for magnetically holding a plurality of objects thereagainst, deflectable pawls situated adjacent said upright member and deflectable inwardly of said plate, and means for moving said upright member downwardly to move the objects held thereto from an upper position downwardly over said pawls to a lower position and for moving said upright member upwardly as said pawls engage the objects and hold the same in the lowered positions the lowermost position being adjacent the conveyor.

2. The magazine according to claim 1 wherein said upright member is a plate having parallel side edges and said pawls are situated adjacent said side edges in aligned pairs.

3. The magazine according to claim 2 including three pairs of pawls.

4. The magazine according to claim 1 including a fixed wall, said upright member being situated adjacent the inner side of said wall, and said wall having a slot through which extends a portion of said moving means connected to said upright member and in which said portion of said moving means is moveable.

5. The magazine according to claim 4 wherein said fixed wall has a plurality of openings through which said pawls extend.

6. The magazine according to claim 5 including means fixed to the outer side of said wall for pivotally mounting said pawls.

7. A system for loading objects onto, and unloading objects from, a conveyor, each object having magnetizable material therein, said system including a first magazine located adjacent one end of a conveyor, a second magazine located adjacent the other end of the conveyor, said first magazine including a generally upright member having means for magnetically holding a plurality of objects thereagainst, deflectable pawls situated adjacent said upright member and deflectable inwardly of said plate, and means for moving said upright member downwardly to move the objects held thereto from an upper position downwardly over said pawls to a lower position and for moving said upright member upwardly as said pawls engaged the objects and hold the same in the lowered positions, the lowermost position being adjacent the conveyor, said second magazine including a generally upright plate having means for magnetically holding a plurality of objects thereagainst, pushing means for pushing each object from the conveyor onto the generally upright plate, said pushing means including an elongate head movable transversely of the long axis thereof, power means for moving said head and means for detachably connecting said head to said power means.

8. The system according to claim 7 wherein said second magazine is constituted solely by said pushing means and said upright plate which does not obstruct the path of movement of objects on the conveyor as and when an object is carried past said second magazine when said power means is inoperative.

* * * * *